No. 715,197. Patented Dec. 2, 1902.
J. M. DALY.
GRAPHIC TONNAGE RESISTANCE INDICATOR.
(Application filed Sept. 30, 1901.)
(No Model.) 2 Sheets—Sheet 1.
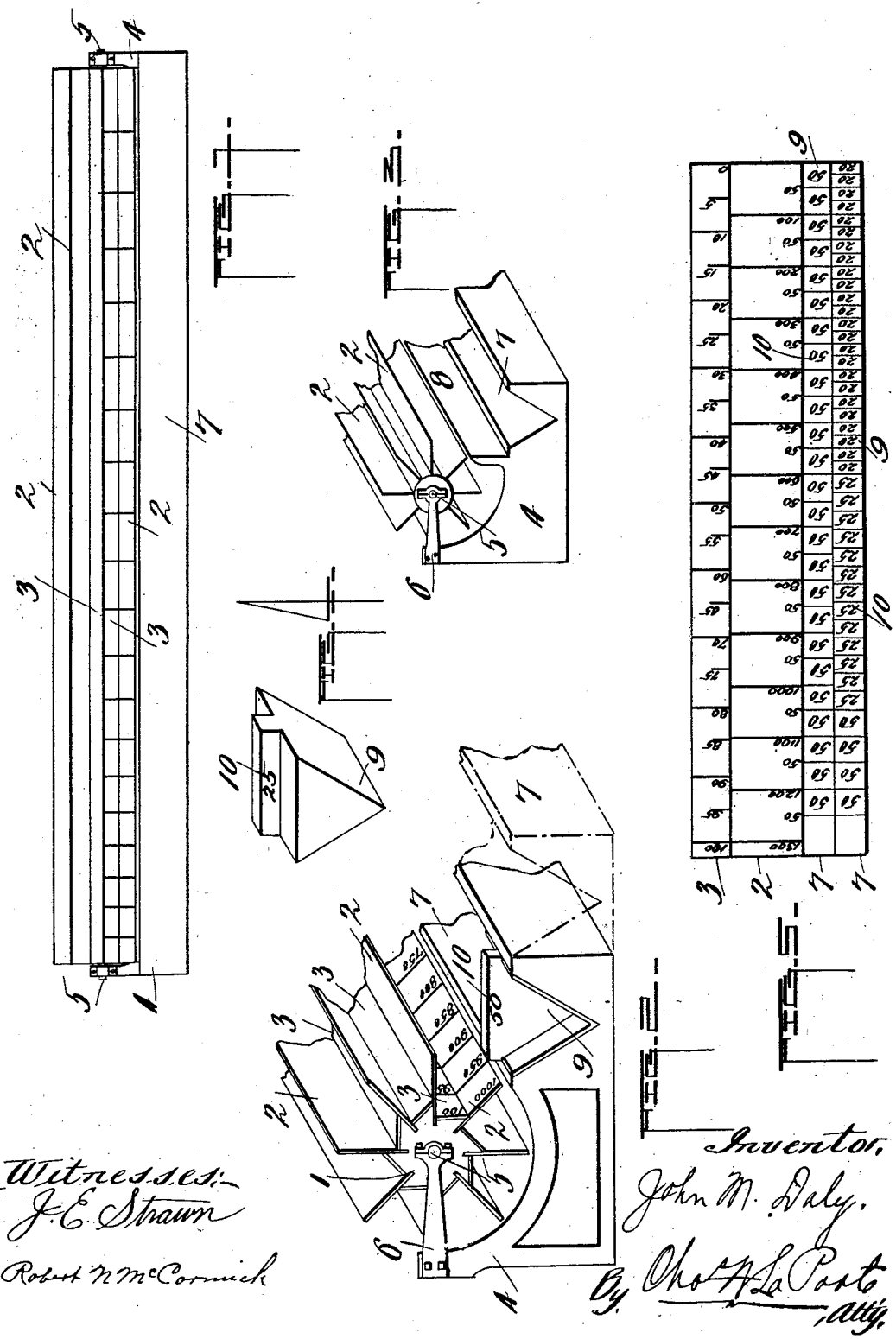

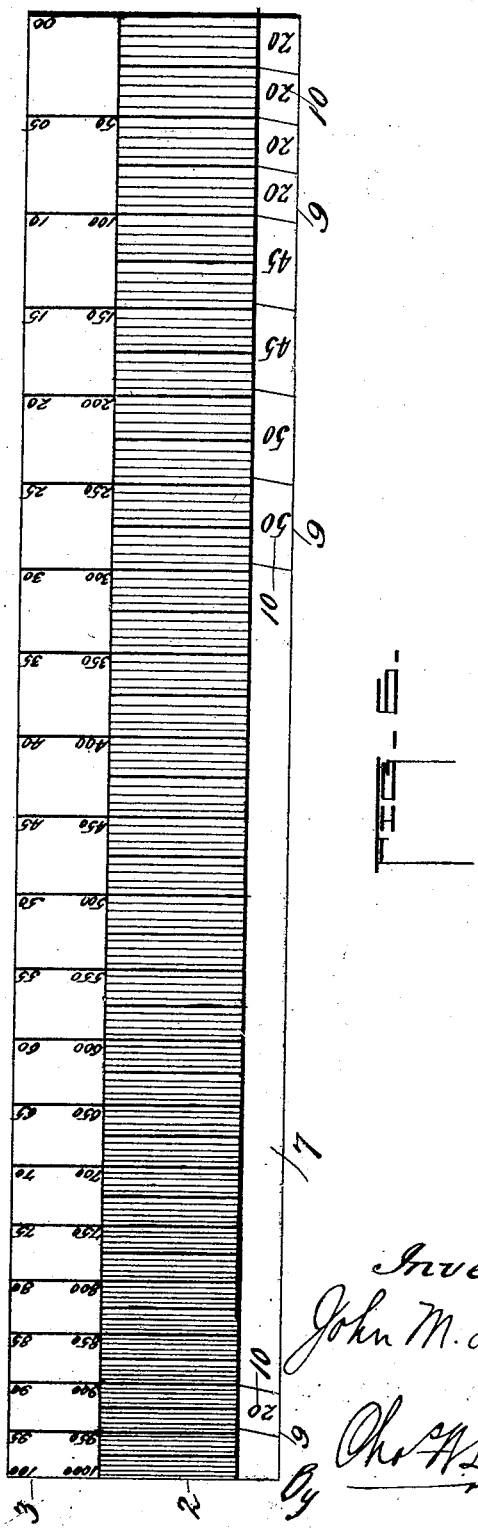

UNITED STATES PATENT OFFICE.

JOHN M. DALY, OF PEORIA, ILLINOIS.

GRAPHIC TONNAGE-RESISTANCE INDICATOR.

SPECIFICATION forming part of Letters Patent No. 715,197, dated December 2, 1902.

Application filed September 30, 1901. Serial No. 76,996. (No model.)

*To all whom it may concern:*

Be it known that I, JOHN M. DALY, a citizen of the United States, residing at Peoria, in the county of Peoria and State of Illinois, have invented certain new and useful Improvements in Graphic Tonnage-Resistance Indicators; and I do hereby declare that the following is a full, clear, and exact description of the invention, which will enable others skilled in the art to which it appertains to make and use the same.

This invention has reference to an indicator, and has for its object to graphically compute the tonnage resistance in railway-trains.

The invention has for its further object an indicating chart or scale comprising a revoluble device with radial arms or paddles, upon which are arranged suitable characters, lines, or other devices.

A further object is the provision of a case, runway, or trough which may form a part of a support upon which the revoluble device is journaled and in such a position adjacent to the radial arms or paddles as to coact therewith in computing such tonnage resistance.

A still further object is the provision of suitable blocks or slugs of varying length, made of suitable material, arranged to have slidable connection with the trough or runway and provided with certain characters upon their body.

That the invention may be more fully understood and readily carried into effect reference is had to the accompanying drawings, forming a part of this specification, in which—

Figure 1 is an elevation which illustrates my tonnage-resistance indicator. Fig. 2 is an enlarged end view, partly in perspective. Fig. 3 is an end view similar to that shown in Fig. 2 with slight changes of construction. Fig. 4 illustrates in perspective one style of block or slug which may be used. Fig. 5 illustrates in outline the key to the use of my indicator. Fig. 6 shows a complete scale and other features.

It was the custom for years in railroading to load trains by the number of cars. Later on cars of extreme weight and capacity were built, so that frequently in a train would be found a car weighing eighteen thousand pounds with a load weighing twenty-four thousand pounds, the total weight being forty-two thousand pounds or twenty-one tons; also, in same train would be a car weighing forty thousand pounds and contents eighty-four thousand pounds, making a total of one hundred and twenty-four thousand pounds, or sixty-two tons. As no distinction was made for a long time on an empty car as against a loaded one it was demonstrated that an engine would not at all times haul its assigned rating in light loaded cars and empties. Hence the rating was reduced to the basis of minimum load on some roads and maximum rating on other roads, resulting in loss on minimum basis at times for failure to haul more and a loss on maximum basis at times caused by delay, overtime to men, injury to power, slipping, and in other ways. Hence it was necessary to change the basis of loading trains to tonnage in place of cars and assigning so many tons for an engine to haul both of empty and loaded cars.

Some roads put in an arbitrary rating on cars—say a fifteen-ton car (empty) rated at twenty tons. Allow this to be the proper rating to first ten (10) cars assigned to train, it is not the proper basis for the last ten (10) cars set into a train of forty (40) or fifty (50) cars, as there is little or no curvature resistance in length of ten (10) cars, as there would be in a train of forty (40) cars. As the distance from the engine increases in number of cars the weight resistance becomes greater.

It is my aim in the present device to accurately compute and weigh the tonnage resistance in trains by a simple and compact indicator.

The device which I employ for graphically computing the tonnage resistance (of trains of cars) comprises a revoluble frame (referred to as 1) having a series of radial arms or paddles 2 and the beveled frame parts 3. The said frame parts are journaled to a base-support 4 through a spindle 5, carried in the bearings 6.

7 refers to a case, runway, or trough lying parallel with the paddles or radial arms 2 and in front of the same in the manner shown or may be connected with and form part of the base portion 4. This case or runway is substantially V-shaped for the reception of suitable devices which have a slidable and detachable relation therewith, to be hereinafter more fully described.

The radial arms or paddles 2 and the bevel portions 3 combined represent a scale or chart designating the tonnage and per cent. of tonnage hauled, the scale being reduced from right to left, or vice versa, if desired, as the tonnage increases in order to provide for length-of-train, curve, and flange resistance. The object of a series of paddles or radial arms in a chart of this character is that a caboose will be hauled at one time by an engine rated at five hundred tons and other times by engines of various rating up to one thousand tons or more, so the necessity for varying charts. This is better understood by referring to Fig. 2 of the drawings, in which the paddles or radial arms 2 designate the tonnage ranging from zero (0) to five hundred tons on one paddle and from zero (0) on each succeeding paddle to one thousand tons, or more or less, as may be desirable. The bevel portions of the paddles 3 represent the per cent. of the tonnage hauled and range from one per cent. to one hundred per cent. on all bevel portions alike or beyond the one hundred as may be desirable in like manner as the rating in tons on the tonnage-chart, as the maximum hauling per cent. of each engine is one hundred, while the number of tons which each engine is capable of hauling varies, as indicated above.

In Fig. 3 the revoluble device is modified slightly to do away with the bevel portions 3, the radial arms 2 thereof being used as the per cent. of tonnage hauled exclusively, and the case, runway, or trough is provided with a longitudinal frame part 8, upon which the tonnage-scale is placed, or, if desired, the tonnage and per-cent. chart may be all placed on the flat surface of the paddles. These charts or scales may be made upon any suitable material and attached to the frame or impressed upon the faces of the paddles and bevel portions, as may be convenient or desirable.

9 represents a suitable slug or block which is substantially V-shaped to adapt it to have a slidable relation and detachable connection with the case or runway 7, and the same is provided with an extension or body part upon which it is designed to place a numeral, figure, or other device 10 as an arbitrary weight-indicator. They may be of uniform or varying length, as desired, for use in connection with the scale or chart; and I do not wish to be limited to the use of a slug or block, as shown in Fig. 2, or that in Fig. 4, nor to a substantially V-shaped case, as the selection of this style of case and slug was convenient and may be modified in many ways. These slugs when used in connection with the scale take the place of cars for measuring and weighing the resistance. It may also be found convenient to use slugs made in various colors instead of figures or other devices.

Attention is directed to Fig. 5, in which the key to the use of my device is illustrated. It is to be noted that this view is a diagrammatic view only and that for clearness the intervals on the chart corresponding to a given number of tons are uniform, but that on the regular chart they are shown contracted. The scale shown in this figure ranges from zero (0) to thirteen hundred tons and shows the per cent. of power of hauling to be one hundred per cent. It is arranged in this diagrammatic view to illustrate the use of duplicate slug-cases in connection with the chart, the case adjacent to the chart for computing the resistance in loaded cars and the outside case for computing the tonnage of empties. In the case for computing the tonnage of loaded cars is shown twenty-five cars thirty-six feet long and approximating fifty tons each, the whole train registering nine hundred feet in length, twelve hundred and fifty tons on the scale or chart, and twelve hundred and fifty tons actual weight, while in the case for computing the number of tons of empty cars in train there are forty-one cars thirty-six feet long, registering fourteen hundred feet train length. Comparing the weight of empties and resistance of train-length, curvature, and flange resistance with reference to the train of loaded cars, the same will register twelve hundred and fifty tons, while the actual weight, deducting flange and curve resistance, will be only ten hundred and five actual tons. Supposing the last four cars in the empty train to be loaded, by deducting these cars there will remain a train length of thirteen hundred and thirty-two feet, equal to eight hundred and five actual tons, registering on the scale ten hundred and fifty tons, whereas, deducting the last four cars in the loaded train, there will be a train length of seven hundred and fifty-six feet, registering an actual tonnage of ten hundred and fifty tons, or the same number of tons as in a train of empties having an actual length of thirteen hundred and thirty-two feet. It is to be noted in this connection that the slugs are marked to indicate the arbitrary weight of cars for measuring and weighing the resistance of same and are placed alongside of the chart in the case to represent the resistance in train based on tonnage, the intervals on the chart corresponding to a given number of tons of resistance being shrunk or decreased in an average manner, as the length of train increases in proportion as the train resistance per ton increases. By reference to Fig. 6 this arbitrary arrangement of slug will be better understood where the slugs are assigned as arbitrary weights. For instance, the first one hundred tons shown in the scale are four (4) slugs marked twenty (20) tons each; but on account of light load an allowance of twenty-five (25) per cent. is made in length of a twenty-ton car and load, that being figured out as the resistance. The next two succeeding cars are of forty-five tons each with load. These get credit for ninety-five tons instead of ninety tons, as would be indicated. Adjoining these cars are two cars registering fifty tons; but as the engine has the train concentrated there will be no allowance made for these cars, and carrying out the same arbitrary scale of arrangement it will be noted that a twenty-ton car under nine hundred tons is equal to over forty tons of resistance on account of length-of-train, flange, and curve resistance.

To further illustrate the usefulness and practicability of my chart in measuring and weighing the tonnage resistance in trains of cars, we will suppose that a conductor of a train is ordered to reduce the tonnage rating from a train from one-hundred-per-cent. rating to eighty-five per cent. To an ordinary conductor or yardmaster it is difficult for him to figure out the proper percentage of reduction of his train to reduce it to eighty-five per cent.; but with a chart of the character described before him the number of tons represented by cars in the train is readily apparent. All that is necessary for him to do is to detach the number of cars represented by tons on the slugs in excess to that shown in the per cent. of tonnage hauled, (indicated by the chart opposite to eighty-five per cent.)

No claim is made in this application on the chart itself, as the same is claimed in an application filed of even date herewith, and I do not wish to be limited to the use of only one chart at a time, as I may wish to use one chart and case to represent light or empty cars and one case and chart to represent heavy cars or combination of both to represent the resistance of trains composed of both light and heavy cars, nor to the arrangement of the parts of the device, nor to confining myself to the arrangement of a case in horizontal, vertical, or diagonal position, nor to radial arms or paddles on the revoluble device, as it may be deemed advisable to make it a revoluble octagon cylinder with the percentage charts for various tonnage trains shown on flat surface, nor do I wish to be limited to a varying-scale tonnage-chart, as I may find it advisable to construct the chart on a uniform scale and allow for the length-of-train resistance by increased allowance in size of blocks or slugs after a given number of cars are placed in slot instead of contracting the scale, as various changes may be made in the details of construction and application without departing from the spirit of invention herein.

Having thus fully described my invention, what I claim, and desire to secure by Letters Patent of the United States, is—

1. A device for graphically computing the tonnage resistance of trains of cars, comprising a chart or scale, a case or runway in conjunction with said chart and slugs to indicate the arbitrary weight of cars for measuring their resistance, as and for the purpose described.

2. A device for graphically computing the tonnage resistance of trains of cars, comprising a chart on or attached to a revoluble frame having radial arms or paddles with suitable signs, in combination with a case or runway and suitable slugs having detachable connection with said case with suitable characters or numerals on their body to indicate arbitrary weight of cars, as and for the purpose described.

3. A device for graphically computing the tonnage resistance of trains of cars, comprising a revoluble frame having radial arms or paddles and bevel portions as shown, signs for indicating the tonnage on the radial arms and for indicating the per cent. of tonnage hauled on the bevel portions, and slugs marked to indicate the arbitrary weight of cars used in conjunction with said revoluble frame, substantially for the purpose described.

4. In a device of the character described, the combination with a chart having signs for indicating tonnage resistance, a slug or similar device arranged with an indicating character representing the arbitrary weight of cars coacting with said chart, substantially for the purposes described.

5. A device for computing the tonnage resistance of trains of cars, comprising a revoluble chart, said chart arranged with a series of radial arms or paddles having thereon a scale indicating an increased or decreased tonnage resistance, and with an adjacent scale indicating per cent. of tonnage hauled, one or more cases or runways in juxtaposition to said chart and a series of slugs having a detachable connection with said case or cases with signs indicating arbitrary weight of cars having a coacting relation with said scales for measuring the resistance, as and for the purpose described.

6. A tonnage-resistance indicator, consisting of a chart arranged with a series of interchangeable scales, a percentage scale in conjunction therewith, duplicate cases in juxtaposition to said scales, devices comprising suitable slugs having a slidable and detachable relation with said cases in such a manner as to coact with the indicator for graphically computing such resistance, as and for the purposes described.

7. A device for graphically computing the tonnage resistance in railway-trains, comprising a series of charts arranged with devices or signs in succession for indicating tonnage and mounted to revolve, and suitable devices indicating the arbitrary weight of cars coacting with said charts, substantially for the purposes described.

8. A device for graphically computing the tonnage resistance in railway-trains, comprising a chart arranged with devices or signs for indicating tonnage, a case or runway in conjunction with said chart, a series of devices representing cars coacting with said case and chart provided with arbitrarily-selected characters or numerals for computing such resistance, in the manner and for the purpose described.

9. Means for computing the tonnage resistance in trains of cars, comprising a chart, a series of devices having arbitrarily-selected characters and proportioned to the chart, for measuring the resistance in a train of cars, of which they form a part, as and for the purpose set forth.

10. A device for graphically computing the tonnage resistance in railway-trains, comprising a series of charts, each chart arranged with signs for indicating a varying amount of tonnage resistance, combined with slugs or similar devices of suitable length marked to indicate the arbitrary weight of cars, used in conjunction with said charts, substantially for the purposes set forth.

11. A device for graphically computing the tonnage resistance in railway-trains, comprising a series of charts on or attached to a revoluble frame, each chart consisting of a tonnage-scale, and a percentage-scale, a case or runway in juxtaposition to said charts having a tapered groove, a series of slugs with tapered bodies having a detachable relation with said case and each marked to indicate the arbitrary weight of cars and coacting with the charts, substantially for the purposes herein set forth.

In testimony whereof I affix my signature in presence of two witnesses.

JOHN M. DALY.

Witnesses:
ANNIE A. BOURGEOIN,
CHARLES H. THOMAS.